Feb. 17, 1959      S. M. CADWELL ET AL      2,873,790
METHOD OF MAKING PNEUMATIC TIRES BY CASTING A LIQUID
POLYESTER-DIISOCYANATE COMPOSITION
Filed April 20, 1953      4 Sheets-Sheet 1
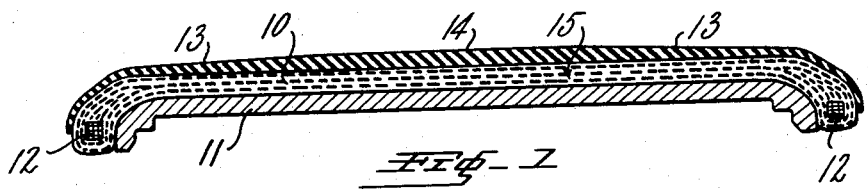
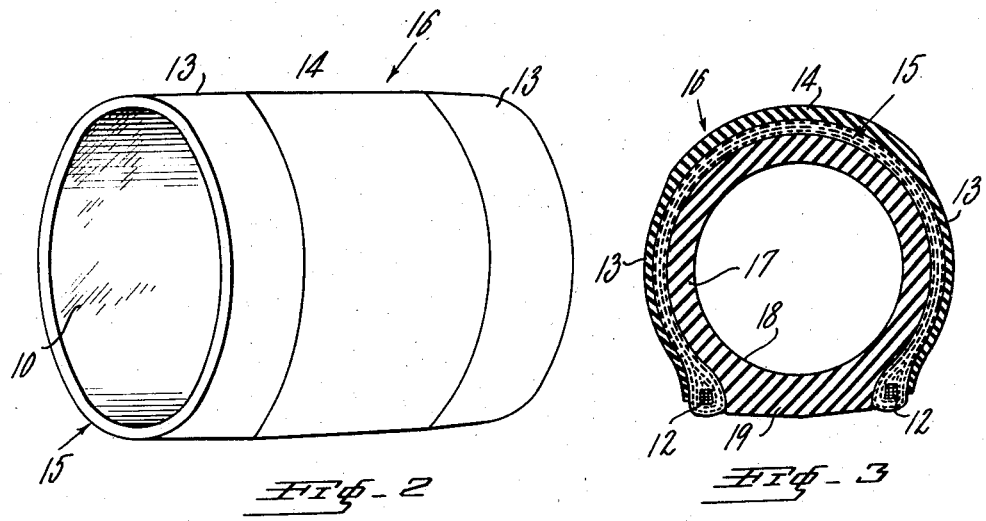
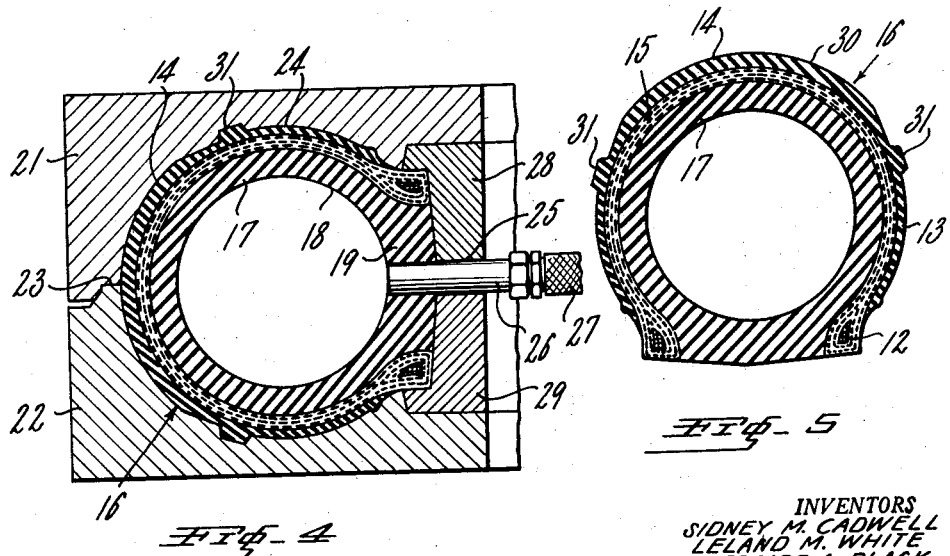
INVENTORS
SIDNEY M. CADWELL
LELAND M. WHITE
SHEPPARD A. BLACK
HENRY R. VARVARO
BY James J. Long
AGENT Feb. 17, 1959 S. M. CADWELL ET AL 2,873,790
METHOD OF MAKING PNEUMATIC TIRES BY CASTING A LIQUID
POLYESTER-DIISOCYANATE COMPOSITION
Filed April 20, 1953 4 Sheets-Sheet 2
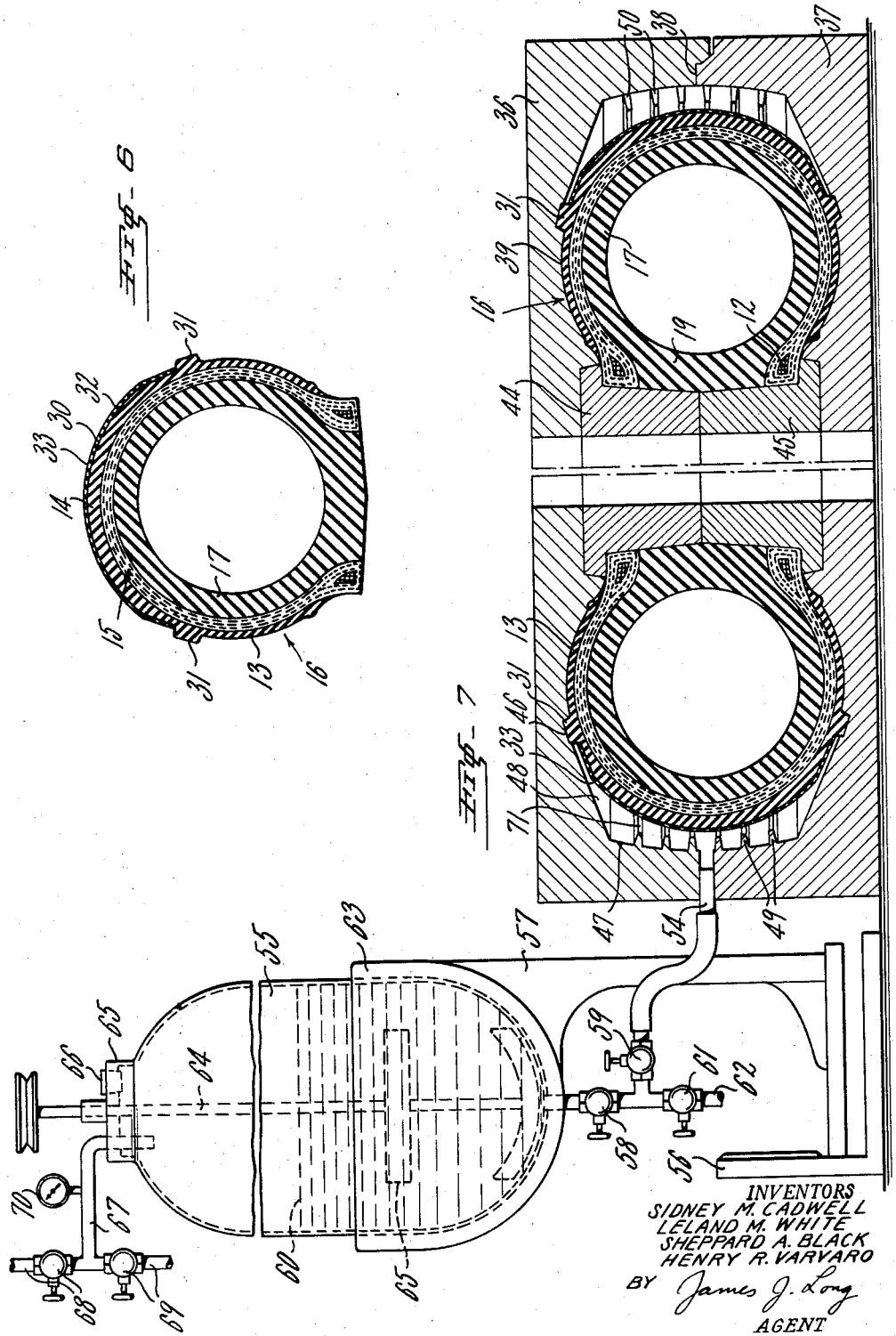
INVENTORS
SIDNEY M. CADWELL
LELAND M. WHITE
SHEPPARD A. BLACK
HENRY R. VARVARO
BY James J. Long
AGENT Feb. 17, 1959   S. M. CADWELL ET AL   2,873,790
METHOD OF MAKING PNEUMATIC TIRES BY CASTING A LIQUID
POLYESTER-DIISOCYANATE COMPOSITION
Filed April 20, 1953   4 Sheets-Sheet 3
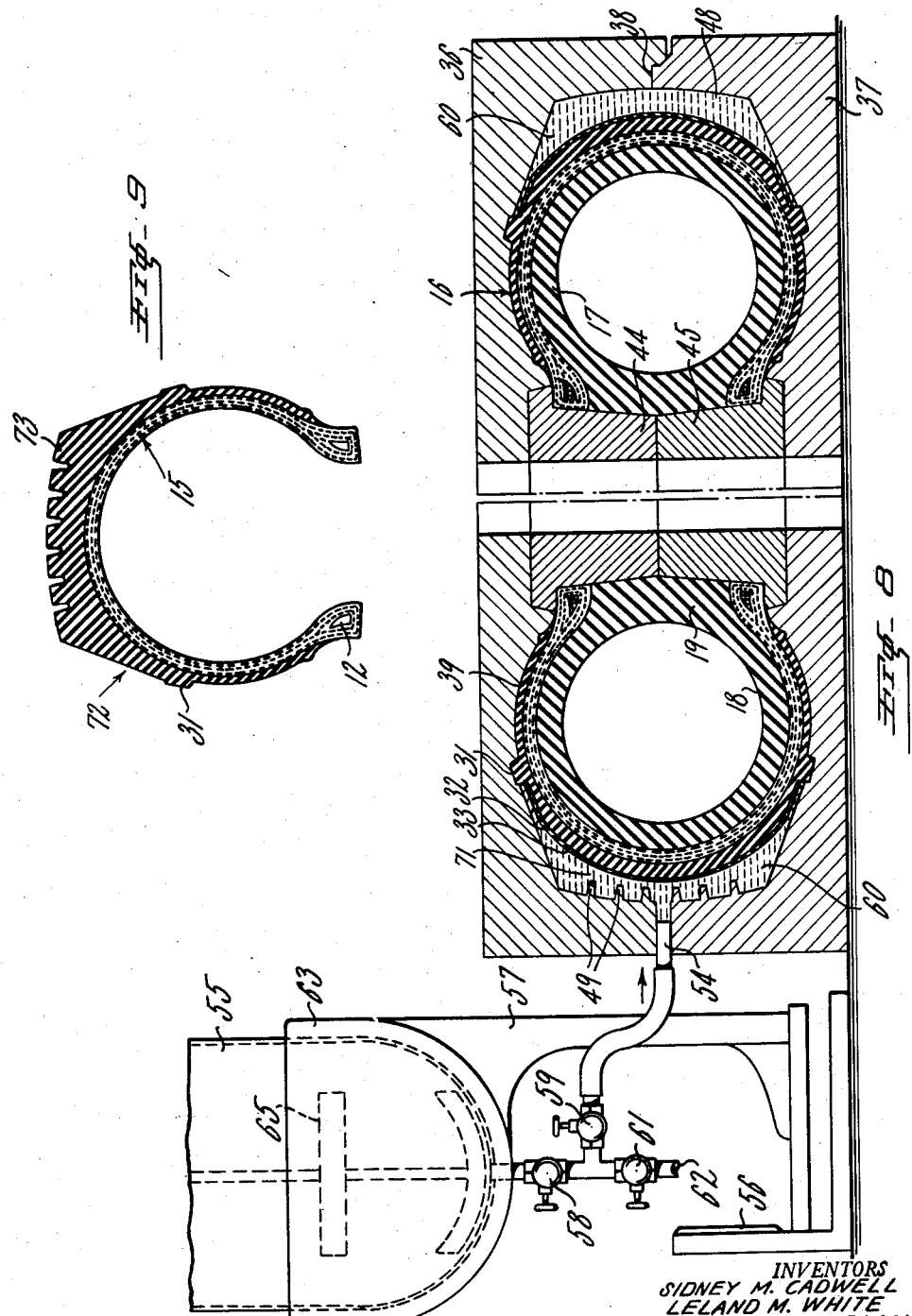
INVENTORS
SIDNEY M. CADWELL
LELAND M. WHITE
SHEPPARD A. BLACK
HENRY R. VARVARO
BY James J. Long
AGENT

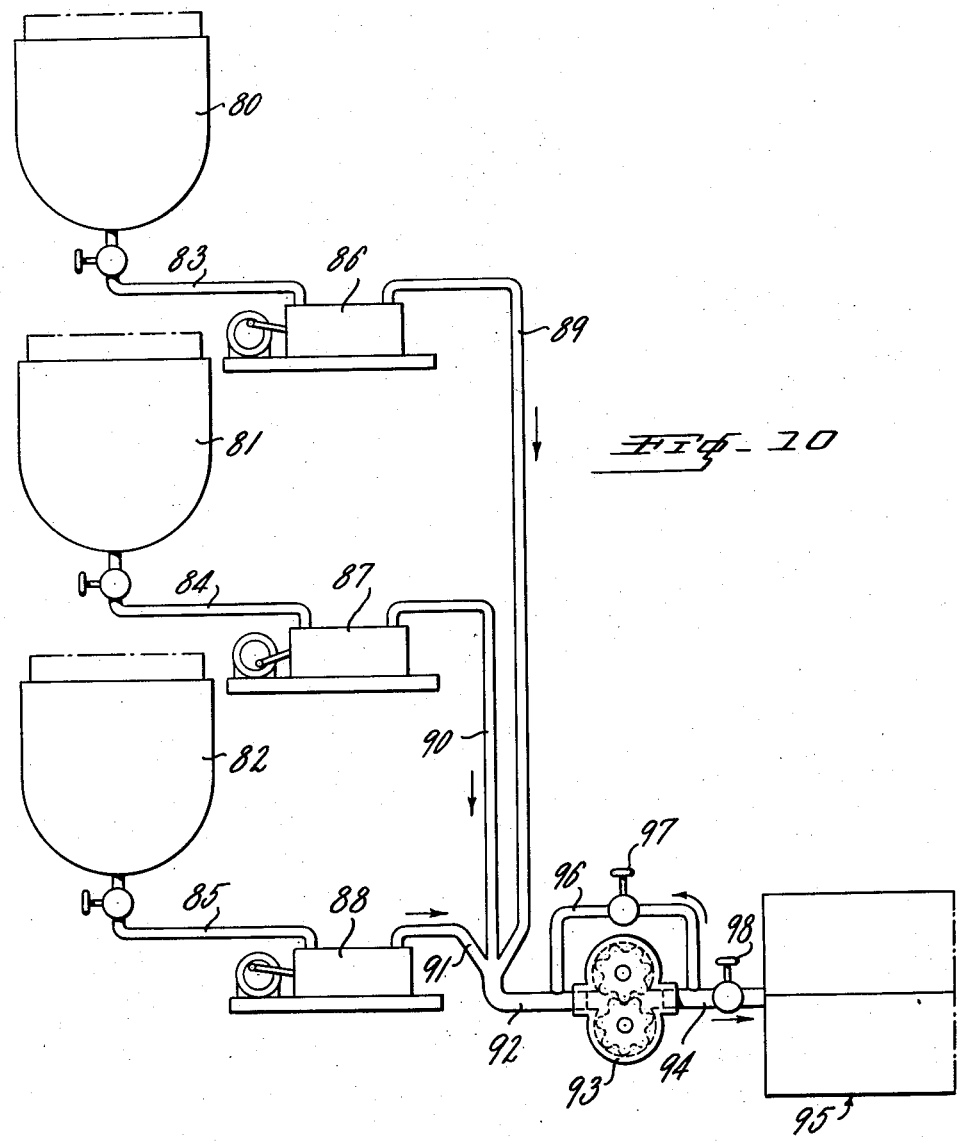

United States Patent Office 2,873,790
Patented Feb. 17, 1959

2,873,790

METHOD OF MAKING PNEUMATIC TIRES BY CASTING A LIQUID POLYESTER-DIISOCYANATE COMPOSITION

Sidney M. Cadwell, Grosse Pointe, Mich., and Leland M. White and Sheppard A. Black, Nutley, and Henry R. Varvaro, Paterson, N. J., assignors to United States Rubber Company, New York, N. Y., a corporation of New Jersey Application April 20, 1953, Serial No. 349,664

8 Claims. (Cl. 154—14)

This invention relates to an improved method of making pneumatic tires, and more particularly it relates to the manufacture of pneumatic tires from materials which are initially in a relatively low-viscosity, readily flowable form, but which after a curing period acquire a tough, rubbery form similar to, and in fact in many respects definitely superior to, the usual vulcanized rubber compositions from which pneumatic tires have previously been made.

A principal object of the invention is to manufacture pneumatic tires by a more economical process than has heretofore been available.

Another object is the provision of a method of making pneumatic tires that eliminates the usual milling and other processing steps ordinarily associated with the manufacture of pneumatic tires, especially the tread portion thereof.

Still a further object of the invention is to provide a tire manufacturing method that is not only more convenient than conventional methods, but is capable of yielding a tire having a longer life, by reason of the increased wear-resistance of the tire tread.

It is still a further object of the invention to provide an improved casting or molding method useful in connection with the fabrication of pneumatic tires or other shaped articles.

The manner in which the invention accomplishes the foregoing objects, as well as additional objects and advantages, will be made clear in the following detailed description, which is intended to be read with reference to the accompanying drawings, wherein:

Fig. 1 is a transverse sectional view of a portion of a raw tire casing being built on a tire building drum in accordance with one method of practicing the invention;

Fig. 2 is a perspective view on a smaller scale of a partial raw tire casing removed from the building drum in band form;

Fig. 3 is a transverse sectional view on a larger scale of the partial casing shaped in toroidal form and containing a tire curing bag;

Fig. 4 is a similar view showing the partial casing and curing bag assembly of Fig. 3 disposed in a vulcanizing mold;

Fig. 5 is a view of the vulcanized partial casing after removal from the mold;

Fig. 6 is a similar view of the casing of Fig. 5 with a thin coating of uncured rubber applied to its outer crown surface;

Fig. 7 is a sectional elevational view of an apparatus for casting a liquid in the shape of a tire tread about the partial tire casing of Fig. 6, such apparatus including a mold containing the partial tire casing preparatory to the casting operation;

Fig. 8 is a similar view of a portion of the apparatus of Fig. 7, showing a rubber-forming liquid injected into place about the tire casing;

Fig. 9 is a transverse sectional view of a completed tire removed from the mold; and, Fig. 10 is a diagrammatic elevational view of an apparatus for carrying out a modified form of the invention.

The invention utilizes, as the rubber composition of the tire, a material which is in a readily-flowable, low-viscosity form prior to its assembly in the tire. We generally use a material that is essentially a liquid at ordinary or moderately elevated temperatures prior to cure, although certain of the advantages of the invention may be attained by employing materials of a pasty consistency. In any case, the essential characteristic of the materials employed in the invention for forming at least the tread portion of the tire casing is that they are basically fluent, that is, they can be poured readily either of their own weight, or with the aid of comparatively moderate applied pressure.

In practicing the invention the liquid rubber-forming material is applied to a tire carcass, which is ordinarily composed of substantially inextensible textile reinforcing elements, such as cotton, rayon or nylon cords, or in some cases steel cables. The reinforcing elements are preferably provided in the form of a cord fabric. The carcass is so arranged in a suitable confining mold as to define, between the outer surface of the carcass and the inner surface of the mold, a cavity having the contour of the desired external contour of the tire. The liquid rubber-forming material is then injected or cast into this cavity and converted into a solid rubbery state under the influence of heat. If the entire outer rubber covering of the carcass is to be made of the cast liquid rubber, the bead or rim areas of the carcass are maintained in fluid-sealing contact with the mold wall in order to confine the liquid. If only selected areas, such as the tread area, are to be cast from the liquid, appropriate adjacent areas of the carcass, whether covered with some other rubber composition or not, are pressed into fluid-sealing contact with the mold cavity walls, and the rubber-forming liquid is poured or otherwise charged into the confined space. In any case, the mold cavity is of larger diameter than the tire carcass, to provide an empty space of the desired shape, into which the rubber-forming substance is introduced. The carcass is backed-up or supported during the injection of the liquid and during the cure by a suitable supporting means, such as a curing bag or blanket.

Preferred rubber forming liquids for use in the invention are those derived by reaction of a polyester with a polyisocyanate, as described by Bayer et al. in Rubber Chemistry and Technology, volume 23, pages 812–835 (1950). When cured, such materials are elastomers capable of being extended to more than 200% of their original length, and returning rapidly to approximately their original length when released, and they may be termed rubbery synthetic polyurethanes. Broadly speaking, such rubbery materials are made from three materials, namely, (1) polyesters or polyester amides, or mixtures thereof, (2) organic polyisocyanates, and (3) curing agents. The polyesters or polyester amides employed contain free hydroxyl or other groups containing active hydrogen such as free amino or amido groups. The curing agents employed, as represented by water, polyhydric alcohols, and polyamines, also contain active hydrogen.

These elastomeric synthetic polymers are often based upon diisocyanate-modified polyesters. As an example, adipic acid may be reacted with ethylene glycol to produce a polyester with hydroxyl groups at each end of the polyester molecules. The individual polyester molecules may be joined by reacting the terminal alcoholic hydroxyl groups with a diisocyanate such as p,p'-diphenylmethane diisocyanate. Subsequent reaction with water or the like in relatively small amounts brings about urea bridging and thus introduces groups which are capable of cross-linking the polymer by reacting with terminal isocyanate groups. The final curing or vulcanizing reaction is brought about by heat in a manner which resembles vulcanization of natural rubber although chemically the cure is effected by a totally different mechanism from ordinary sulfur vulcanization. The polyurethane polymer contains, built into its molecules as a result of the reaction with water, everything required for its curing. The curing occurs as a result of reaction of the urea groups with remaining isocyanate groups.

In greater particularity, many of the elastomeric synthetic polyurethane polymers are made by first preparing a linear chain-extended polyester from a glycol, for example, a mixture of ethylene and proplyene glycols, and an aliphatic saturated dicarboxylic acid, for example, adipic acid, using an excess of the glycol over the acid so that the resulting polyester contains terminal alcoholic hydroxyl groups. Usually such an amount of glycol is used as to give a polyester having a hydroxyl number of 20 to 120, and preferably 40 to 80, and a low acid value. This polyester is reacted with a diisocyanate, for example, naphthalene 1,5-diisocyanate or p,p'-diphenylmethane diisocyanate, using a considerable molar excess, commonly from a 20% to a 250% and preferably from a 50% to a 100% molar excess, of the diisocyanate over that amount which would be required to react with all of the alcoholic hydroxyl groups furnished by the polyester. The reaction is frequently effected by heating a mixture of the polyester and the diisocyanate under anhydrous conditions at an elevated temperature, e. g., 70–150° C., to form a liquid material which is a linear polyurethane having terminal isocyanate groups. This liquid material (which is often termed a "polyester-diisocyanate"), when reacted with a small amount of water, typically equal to about 0.6 to 0.95 mole per mole of the liquid material, is converted into a solid form resembling natural rubber. The water reacts with a portion only of the isocyanate groups present, converting them to —NH$_2$ groups which are highly reactive with other isocyanate groups to form urea groups, that are in turn reactive with remaining isocyanate groups to give a highly cross-linked product. Such cross-linking, or cure, of the mixture is effected by simply heating it under pressure at an elevated temperature, say about 200–350° F., for a suitable period of time, say from 10 minutes to 3 hours. The cured or cross-linked product resembles vulcanized natural rubber. Instead of using water as the curing agent to convert the liquid intermediate to a rubbery state, other chemicals with active hydrogen atoms, e. g., dihydric and higher polyhydric alcohols, beta-aminoethyl alcohol, and polyamines such as diamines, can be used. However, the alcoholic types of curing agents are not particularly desirable for use in the invention, because the physical properties of the final cured product obtained with these agents are relatively poor. The rubber-forming liquid utilizing water as the curing agent liberates carbon dioxide gas during the cure, and therefore sufficient pressure must be applied to dissolve this gas at vulcanizing temperature if a porous or spongy structure is not desired. Such pressure may be applied throughout the casting operation, or at some stage prior to the point where the material becomes too far advanced in cure to knit together homogeneously under the influence of heat and pressure. When amines or alcohols are used as curing agents, the cure is not accompanied by evolution of gas.

A tire carcass suitable for use in practicing the invention is prepared by superimposing successive plies 10 of tire fabric on the surface of a tire building drum 11, as shown in Fig. 1. Such tire fabric is prepared by coating the textile reinforcing elements with a suitable adhesive, followed by application of a thin skin of vulcanizable rubber carcass stock. The tire fabric is cut on a bias so that the reinforcing elements run from one side of the fabric to the other at a definite pre-determined angle, and the plies are so arranged on the tire building drum that the cords in successive plies run in opposite directions. The edge portions of the plies are wrapped around bead assemblies 12, that are composed of rubberized wire bundles, to render the marginal edges of the tire casing substantially inextensible.

In accordance with a preferred practice of the invention the thus-formed tire carcass is provided with a portion of its outer covering in the form of the usual natural or synthetic rubber composition at least over the sidewall areas of the carcass, and we generally also apply a suitable rubber stock, known as sub-tread or base stock, over the outer crown or under-tread area of the carcass, leaving only the tread proper or cap portion to be subsequently formed from the liquid rubber-forming chemical. The sidewall and base stocks are usually formed in the desired shape by extrusion processes, although they may also be at least in part calendered in the desired shape, and sometimes we mold them either by compression or injection methods. Ordinarily the sidewall and base stocks are applied to the carcass as a unit while the carcass is in band form, conveniently on the tire building drum, but such rubber stock is sometimes also applied to the carcass after it has been shaped in annular toroidal form with the aid of the usual vacuum shaping box.

In Fig. 1, we show an extruded unitary sidewall 13 and base stock portion 14 applied to the carcass 15 on the building drum 11. It will be understood that the building drum is collapsible radially by the usual mechanism (not shown) for easy removal of the thus assembled raw tire casing in the form of a generally flat annular band 16, as shown in Fig. 2.

The resulting partial tire casing 16 is then prepared for vulcanization by shaping it either in the usual vacuum shaping box with the aid of a separable curing bag, or by shaping it in that type of vulcanizing press containing an integral curing bag or blanket, wherein the carcass in band form is simultaneously automatically shaped and enclosed in the vulcanizing mold. The integral blanket or diaphragm of such automatic molding presses is an annular, extensible and resilient form capable of being expanded by inflation, and it is similar in function to the ordinary removable curing bag.

In Fig. 3 we show the casing 16 after shaping in annular toroidal form, and containing an inserted curing bag 17 which is an inflatable doughnut shaped form of extensible material, generally similar to an inner tube but having heavier walls, and serving to support and help shape the assembly during the subsequent molding. The curing bag has an internal cavity 18 into which a liquid or gaseous inflating and heating medium may be introduced under pressure. The rim or base portion 19 of the curing bag is relatively thickened and is so shaped as to aid in properly shaping the bead areas of the casing and in maintaining them in proper place within the mold.

The assembly of shaped raw partial casing 16 and curing bag 17 is then deposited in a vulcanizing mold, shown in Fig. 4, comprised of hinged upper and lower halves 21, 22 separable at a central parting line 23, and provided with the usual heating means, such as internal passageways (not shown) for hot water or steam. The two mold halves define a mold cavity 24 that has the shape of the desired external contour of the tire, except that no provision is made for a cap or tread portion on the molded tire. A radial opening 25 at the inner periphery of the mold accommodates a valve stem 26 of the curing bag, and such stem is attached to a flexible pipe line 27 leading to a supply of heated fluid under pressure, to fill the cavity 18 of the bag. Under the influence of externally and internally applied heat, the partial tire casing becomes vulcanized while it is pressed into firm contact with the walls of the mold by the pressure applied internally by the curing bag. The mold assembly includes the usual upper and lower toe rings 28, 29 at the inner periphery of the mold, to maintain the tire bead areas firmly in place against the thickened base portion 19 of the curing bag. After vulcanization of the tire to the desired extent has taken place, the tire is removed from the mold.

The upper external surface of the vulcanized casing is thereafter provided with a surface of raw rubber stock that is vulcanizable to a soft condition. For this purpose the upper or outer crown portion 30 (Fig. 5) of the cured partial casing 16 is preferably buffed to provide a fresh surface over the entire area located between the buffing ribs 31, which were molded near the shoulder portion at each side of the casing during the foregoing curing operation. A rubber cement is then applied to this surface and thereafter a thin layer of soft vulcanizable rubber stock is applied, conveniently in the form of a calendered sheet 32 (Fig. 6), which is stitched firmly in place.

We then apply to the outer surface 33 of the raw rubber layer 32 an adhesive material to promote better union between the subsequently applied tread and the casing. Polyisocyanate or polyisothiocyanate adhesives are suitable for this purpose. The preferred materials are diisocyanate adhesives, and they are conveniently applied as a solution in a suitable volatile solvent. The diisocyanate may be employed in the form of such proprietary materials as that known by the trade designation MDI, marketed by the Du Pont Company. In general, adhesive materials of this character may be defined as organic polyisocyanates containing more than one —N=C=O group, and they preferably have the general formula OCN—R—NCO, where R is a divalent hydrocarbon radical, as in polymethylene diisocyanates such as ethylene diisocyanate, alkylene diisocyanates such as propylene-1,2-diisocyanate, alkylidene diisocyanates such as ethylidene diisocyanate, cycloalkylene diisocyanates such as 1,4-diisocyanatocyclo-hexane, as well as aromatic polyisocyanates such as m-phenylene diisocyanate, and aliphatic-aromatic diisocyanates such as phenylethylene diisocyanate. The corresponding polyisothiocyanates may also be used. Such substances contain a plurality of —N=C=S groups, preferably two such groups, preferably attached to a divalent hydrocarbon radical R as defined previously, and as represented by such materials as 2,3-dimethyltetramethylene diisothiocyanate, and diphenyl-4,4'-diisothiocyanate. In general the adhesive materials have a plurality of groups of the formula —N=C=X, where X is oxygen or sulfur as represented, for example, by benzene-1,2,4-triisothiocyanate.

For the purpose of forming a tread on the tire casing, there is provided an additional mold assembly, which may be of the automatic shaping type containing an integral curing bag and adapted to receive a raw tire carcass in band form, if the tire carcass has not been previously shaped and vulcanized. In the case of a tire casing that has previously been shaped and vulcanized as described, the additional mold for forming the tread is suitably comprised, as shown in Fig. 7, of hinged upper and lower mold halves 36, 37 separable at a central parting line 38 and defining a mold cavity 39 having the shape of the external contour of an entire tire casing. The partial casing 16 is deposited in the mold as shown in Fig. 7. The mold is provided with the usual heating means (not shown) for heating it to vulcanizing temperatures, as well as with upper and lower toe rings 44, 45 that maintain the bead portions 12 of the casing 16 firmly in place against the enlarged base 19 of the curing bag 17. Under the influence of fluid pressure exerted within the interior cavity 18 of the curing bag, the sidewall areas 13 of the casing 16 are forced firmly against the corresponding faces of the mold cavity 39 in fluid-sealing engagement therewith. The buffing ribs 31 at each side of the tire extend partially into corresponding recesses 46 in the sides of the mold cavity, also in fluid-sealing engagement. Between the outer crown surface 33 of the tire and the tread surface 47 of the mold cavity there is defined an empty space 48 having the shape of the desired tread portion of the tire. Radially inwardly projecting ribs 49 extend from the tread surface of the mold for the purpose of forming a desired anti-skid grooved pattern in the final tire. The tread cavity is gradually tapered over each shoulder surface of the tire to the edge of the buffing rib, where the tread cavity terminates. The ribs 49 may be cut through axially of the mold at several spaced points around the circumference of the mold to provide transverse passageways 50, suitably ¼" or so wide, across the ribs to aid in complete distribution of the liquid tread-forming material. It will be understood that the mold may be provided with the usual fine vent openings (not shown) for escape of air.

The liquid rubber-forming chemicals are suitably introduced into the mold cavity through a supply line 54 that extends radially outwardly from the tread surface of the mold to the bottom of a supply tank 55 that is supported on a scale 56 by an upright supporting standard 57. Valves 58, 59 in the supply line 54 serve to control the flow of rubber-forming liquid 60 from the tank to the mold, while an additional valve 61 and outlet nipple 62 serve for draining excess material from the tank. A heating jacket 63 encloses the lower portion of the tank, and an agitator 64 extends downwardly inside the tank, from the closed top 65 thereof, below the level of the liquid 60. The top of the tank is also provided with a removable plug 66 to give access to the interior of the tank, while a pipe connection 67 serves either for application of air pressure to the tank through a valve and pipe line 68, or of vacuum through a valve and pipe line 69. A pressure gauge 70 connected in the pipe line 67 serves to indicate the pressure within the tank.

To form the tire tread, air or other suitable gas is introduced to the upper part of the tank 55 containing the rubber-forming liquid 60 and the valves 58, 59 in the connecting lines 54 are opened, thereby forcing the liquid into the space 48 between the tread surface 47 of the mold and the outer surface 33 of the tire casing as indicated in Fig. 8. The tire casing is meanwhile urged into fluid sealing contact with the mold at the buffing rib 31 by the internal pressure exerted by the curing bag. However, such internal pressure is insufficient to force the outer surface 33 of the casing against the inner surface of the projecting ribs 49, with the result that a definite space 71 is left between the surface of the casing and the ribs, such space representing the underskid depth of the tread. The liquid 60 flows circumferentially around the mold cavity and transversely across the space 71 to all parts of the tread space as well as through the transverse cuts 50 (Fig. 7) in the ribs if such are provided for this purpose. When a sufficient amount of liquid to fill the mold space has thus been introduced, as indicated by a predetermined decrease in weight on the scale 56, the valve 59 is closed and the liquid 60 in the cavity 48 is cured to the rubbery state by application of heat to the mold.

After completion of the cure, the finished tire 72 has the appearance shown in Fig. 9, with the cast tread 73 forming an integral firmly adhered portion of the outer rubber covering of the carcass.

The following is an example of a stock suitable for forming the unvulcanized coating or layer 32 (Fig. 6) over the cured partial casing:

| | |
|---|---|
| Smoked sheet | 100 |
| Gastex (carbon black) | 30 |
| Stearic acid | 0.5 |
| Zinc oxide | 3.0 |
| Pine tar | 3.5 |
| Tuex (tetramethylthiuramdisulfide) | 2.0 |
| Sulfur | 1.5 |

The foregoing composition when vulcanized has a hardness of about 50–55 on the Shore A scale. In all cases it is preferred that the layer 32 be so compounded as to be vulcanizable to a comparatively soft state, within the range of from 40 to 70, and preferably within the range of from 50 to 60.

The rubbery parts of the tire carcass or outer rubbery covering of the casing that are not made from the cast liquid rubber-forming material are preferably composed of natural rubber or of synthetic rubber, especially butadiene copolymer rubber, e. g., butadiene-styrene copolymer; butadiene-acrylonitrile copolymer; copolymers of butadiene with acrylic esters or fumarate esters or vinyl pyridine, or other copolymerizable monoethylenically unsaturated materials; similar copolymers of substituted butadienes such as methyl butadiene; homopolymers of dienes such as polychloroprene and polyisoprene; low-temperature copolymers of the Butyl rubber type such as isobutylene-isoprene copolymer, elastomers such as chlorosulfonated polyethylene, and, in general, the various synthetic rubbers known to the tire building art, all as compounded for their particular function in the tire in accordance with known compounding principles. It is also possible to fabricate the tire entirely or substantially entirely of the polyurethane type of rubber. When the liquid material based on a polyurethane is cast against a surface of a vulcanizable rubber in an uncured condition in accordance with a preferred practice of the invention, a suitable accelerator to include in the vulcanizable rubber stock in contact with the casting liquid is tetramethylthiuramdisulfide, in amount sufficient to substantially complete the cure of the rubber within the time and temperature cycle employed to harden the liquid material to the rubbery state. As indicated previously, the adhesion of the cast polyurethane rubber to the other rubber parts of the tire, whether the rubberized carcass itself or a partial rubber covering over the carcass, is promoted by use of an adhesive based on a diisocyanate. Preferred adhesive compositions include mixtures of 5–50% of polyester-diisocyanate reaction product, 25–70% of diisocyanate and 10–50% of a suitable volatile organic solvent, such as toluene.

The following is an example of a diisocyanate adhesive composition suitable for application to the surface 33 (Fig. 6), preparatory to casting the tread:

| | Parts by weight |
|---|---|
| p,p'-Diphenylmethane diisocyanate [1] | 62.5 |
| Organic solvent [1] | 20.0 |
| Polyester-diisocyanate [2] | 17.5 |

[1] 20 parts of p,p'-diphenylmethane diisocyanate were added as MDI-50. MDI-50 is a proprietary preparation of 50% diphenyl methane diisocyanate and 50% organic solvents.
[2] Made by esterifying adipic acid with an excess of a mixture of ethylene and propylene glycols in a molar ratio of 70 mols of ethylene glycol to 30 mols of propylene glycol. Water is distilled off from this reaction mixture followed by removal of some glycol to give a polyester containing terminal alcoholic hydroxyl groups. This polyester has a hydroxyl value of about 50, an acid value below 2, and a molecular weight of about 2,000. This polyester is then reacted with p,p'-diphenylmethane diisocyanate, using 2 moles of the latter per mole of the polyester, to give a liquid polyester-diisocyanate reaction product.

To prepare the rubber-forming chemical mixture for injection we usually compound a polyester, and a diisocyanate, such as described above in connection with the adhesive, in mole ratio of about 1:2 along with up to about 1 mole of water. We have found that it is preferable to add the water to the polyester, and after obtaining a uniform composition by permitting the water-polyester mixture to stand overnight or by agitating it vigorously, we then add the diisocyanate, conveniently heated above its melting point if it is not a liquid at room temperature. The mixture is thoroughly agitated in the storage tank for a period of 5 or 10 minutes, the temperature of the mixture during this period generally being within the range of from about 35° to 50° C. During this time the polyester, the diisocyanate and the water inter-react, with evolution of carbon dioxide gas. Another procedure is to mix the diisocyanate with part of the polyester, and then blend this mixture with the remainder of the polyester containing the necessary amount of water.

After limited reaction has taken place, but before any appreciable cure has occurred, that is, while the mixture is still definitely in a fluid state, air pressure is applied to the upper portion of the storage tank and the valve in the connecting line is opened to charge or inject the fluid into the tread cavity, as previously described.

In all cases, we inject or charge the material into the mold while it still has a viscosity under 100,000 poises. We prefer to inject the liquid at still a less reacted or less polymerized stage, that is, while it has a viscosity well under 10,000 poises, and even more preferably we fill the mold with the liquid while the viscosity is not over 1,000 poises. Most preferably, the liquid is at such a stage of polymerization or cure as to have a viscosity of not more than 100 poises, say about 50 poises, when injected into the mold.

Moderately elevated temperatures, e. g., 30–60° C., or in some cases even higher temperatures such as 100–120° C., are useful for facilitating the injection, although with the more reactive compositions of polyester, diisocyanate and curing agent care must be taken not to expose the liquid to elevated temperatures for a period of time sufficient to pre-cure the liquid to an undesirable extent.

The mixing of the materials preferably should be conducted at temperatures below 60° C., and more preferably below 50° C., although somewhat higher temperatures may be applied immediately prior to the injection. In connection with the preferred embodiment of the invention involving intimately mixing the polyester and the water before adding the diisocyanate, it should be pointed out that the advantages of such procedure are obtained only when the mixing of the diisocyanate is carried out below 70° C., and preferably at less than 60° C., say 30°–50° C. At higher temperatures, rapid reaction and foaming take place.

A specific example of the preparation and use of the rubber-forming liquid is as follows:

Adipic acid was esterified with an excess of a mixture of ethylene and propylene glycols in a molar ratio of 70 moles of ethylene glycol to 30 moles of propylene glycol, by distilling water off from the mixture, followed by removal of some of the glycol, to give a polyester containing terminal alcoholic hydroxyl groups. This polyester had a hydroxyl value of about 50, an acid value below 2 and a molecular weight of about 2,000.

50.2 grams of water (2.79 moles) was dissolved in 725 grams of this polyester.

4 grams of carbon black was added to an additional 156 grams of the polyester, and this mixture was mixed on a paint mill, where an additional 230 grams of the polyester was added. The mixture of carbon black and polyester was then added to the foregoing mixture of water and polyester, to give a composition containing about 1111 grams of polyester (0.6 mole).

1530 grams of p,p'-diphenylmethane diisocyanate (6.2 moles, M. P. 37° C.) was heated to a molten condition at 65° C. and added to an additional 4579 grams of the polyester (2.5 moles, to make a total of 3.1 moles of polyester in the entire mixture), and this mixture was stirred into the previously prepared mixture of polyester, water and carbon black. The mixture began to evolve carbon dioxide, indicating that the water was reacting. The mixture was stirred in the closed storage vessel 55 for about 6 minutes.

Air pressure of about 8 p. s. i. was applied to the upper portion of the tank, and the valves 58, 59 in the connecting line were opened, thereby injecting the mixture into the tread cavity of the mold assembly, containing a tire casing having an unvulcanized rubber crown surface coated with diisocyanate cement, as previously described. The mold was initially unheated. After about 2 minutes, 10 pounds of the rubber-forming liquid had been injected, and one of the connecting valves 59 was closed, while another valve 61 was opened to empty the unused liquid from the storage tank. Prior to the start of the injection operation, an air pressure of 25 p. s. i. was applied to the interior of the curing bag contained within the tire.

The thus-injected liquid was permitted to remain within the closed cold mold for a period of about 28 minutes, during which time a gradual thickening of the liquid took place. At the end of this period, a total of 36 minutes had elapsed from the time that the polyester, diisocyanate and water had first been mixed together, and all during the elapsed time gradual reaction and thickening of the mixture proceeded at a definite rate, although at this stage the mixture was still essentially uncured, that is, the liquid had not yet been converted to a solid rubber state. The mold was then heated to about 320° F. After 45 minutes at this temperature, the air pressure in the curing bag was increased to 160 p. s. i. to insure complete dissolution in the mixture of the carbon dioxide gas evolved as a result of the curing reaction, as well as to insure that the shrinkage that took place during the cure would be thoroughly compensated for. In this way formation of a dense, homogeneous, well-defined tread with a good surface appearance and free from internal discontinuities, was assured. At the time of such pressure increase, the cure of the liquid within the mold had proceeded to the extent that the material was no longer in the liquid state, although the cure had not proceeded to the extent that the material was not susceptible to further shaping under the influence of applied heat and pressure. The heating of the mold was continued until a total of three hours of heating had elapsed, whereupon the heating was discontinued and cold water was circulated through the heating chambers of the mold for a period of about one hour. The internal pressure in the curing bag was then released and the mold was opened and the tire was removed. The purpose of cooling the mold was to make certain that no "blowing" would take place within the tread, as might happen in the event that small bubbles of carbon dioxide gas were present, if the pressure were released while the mold was hot.

To insure complete dissolution of the evolved carbon dioxide it is preferred that a pressure of at least 100 p. s. i., and more preferably at least 150 p. s. i., be exerted during the molding, prior to the final stage of the cure. Such high pressures of 100–150 p. s. i. or more are preferably applied before the cure of the mixture has advanced to the stage where its viscosity exceeds 100,000 poises.

The resulting tire was completely cured as a result of the foregoing heating cycle, and the injected liquid was converted to a perfectly firm and rigid rubbery state, resembling the usual natural or synthetic rubber compositions ordinarily used for making tire treads. During the heating, the interposed layer 32 of raw soft vulcanizable rubber stock also became completely vulcanized. The cast polyurethane rubber became intimately coalesced and merged with the adhesive surface of the stock 32 at the interface.

In another form of the invention we provide for separate storage of some or all of the several reactive constituents of the rubber-forming liquid, and meter the materials individually from such separate storage facilities to the mold cavity, while effecting continuous intimate mixing of the ingredients immediately prior to their entrance into the mold cavity. Thus, we may store the polyester, the polyisocyanate, and the active hydrogen-containing curing agent such as water in three separate containers, from which they are discharged simultaneously at carefully proportioned rates into a device capable of effecting thorough mixing of the ingredients, such as a gear pump or colloid mill, whereupon the mixed ingredients are introduced into the mold containing the tire carcass previously prepared as described. The several ingredients may be mixed together simultaneously in a single mixing device, or selected ones of the ingredients may be blended, followed by blending of remaining ingredients. Alternatively, selected basic ingredients may be pre-blended and placed in one storage tank, while another basic ingredient is placed in a second storage tank and the materials may be metered from these tanks, blended, and introduced into the mold, all in a continuous and rapid charging operation. A preferred practice is to mix the polyester and water and store it in one container, and store the diisocyanate in a second container, and thereafter meter, mix, and inject the material simultaneously from these two containers. Another preferred practice is to meter the polyester and water into a mixing zone, from which the water-polyester are continuously conveyed in a homogeneously mixed condition into a metered stream of diisocyanate supplied from a second container, and then intimately blend and inject the resulting common stream containing all three ingredients.

Referring to Fig. 10, we may provide three storage vessels 80, 81 and 82 containing, respectively, polyester, diisocyanate, and water. Pipe lines 83, 84, 85 lead from each vessel to metering pumps 86, 87, 88 which are in turn connected by pipe lines 89, 90, 91 to a common duct 92 leading to a gear pump 93. A connecting pipe line 94 leads from the gear pump 93 to a tire mold 95, which may be constructed, as previously described, to accommodate a tire carcass in such manner as to provide an empty cavity around at least the tread portion of the carcass. A by-pass pipe line 96 is connected across the gear pump from the pipe 92 to the pipe 94, and such by-pass is fitted with a valve 97. A valve 98 is mounted near the mold in the line 94 to regulate the flow of material into the mold, and to close off the mold cavity after it is charged.

In operation, the basic ingredients are charged to the three storage tanks 80, 81, 82 and passed through the respective lines 83, 84, 85 at definite pre-determined rates by means of the several metering pumps 86, 87, 88. It will be understood that the metering pumps, which are commercially available devices, are capable of delivering accurately measured quantities at a desired rate, and the relative rates of delivery of materials by the three pumps will be so adjusted that the ingredients are provided in the desired molar ratios. The three liquids thus proportioned pass through the connecting lines 89, 90, 91 into the common duct 92 where they intermingle and flow into the gear pump 93. The gear pump serves to subject the ingredients to the severest agitation so that the several components become thoroughly and homogeneously blended before entering the mold 95 through the connecting line 94.

In order to insure the most thorough mixing of the materials, the valve 98 in the entrance line 94 and the valve 97 in the return by-pass 96 around the gear pump 93 are so regulated that about ten volumes of liquid are returned through the by-pass for each volume that is delivered to the mold. In this way the liquid is made to pass through the gear pump many times before it is charged to the mold.

After the mold is charged, the cure is effected by heat in the same manner as previously described.

The tire tread made in the foregoing manner is remarkably resistant to wear, and actual tests have shown that compositions of the kind described are capable of outlasting the usual natural and synthetic rubber compositions that have to be applied in solid form.

From the foregoing description it will be apparent that the invention affords a tire manufacturing method that has many advantages over the prior art practices. Because the rubbery material from which the outer covering of the tire is made at least in part, is initially in the form of a liquid, the need for cumbersome and expensive processing of the usual solid rubber stocks is substantially reduced. Thus, the need for expensive and heavy equipment such as Banbury mixers and roll mills is obviated by the use of rubber-forming material in liquid form, with resulting significant reduction in the capital investment required to manufacture a given number of tires, as well as resulting reduction in operating and maintenance costs.

When the mold is charged with the rubber-forming liquid while in such an uncured or partially polymerized state that the viscosity of the fluid is still relatively low, the mold is easily filled completely, and the liquid readily conforms to the desired tread pattern with great faithfulness. Moderate injection pressures are readily transmitted through such a liquid to all parts of the mold. For this reason the advantages of the invention are realized to the fullest extent when the liquid is injected into the mold at such a stage of reaction that it has a viscosity under 1000 poises, and most preferably of not more than about 100 poises, as indicated previously. With such lower viscosities, the more moderately elevated injection temperatures, e. g., 40°–60° C., can be used to greatest advantage.

The use of a tire carcass that has previously been vulcanized has a particularly advantageous aspect in that more uniform centering of the tire, with resulting proper uniform dimensional control and proper balance, is facilitated because the vulcanized tire carcass already has imparted to it a definite desired uniform shape, which it tends to retain in the face of possible distorting forces applied to the carcass when the liquid material is injected thereon under pressure.

The use of an intermediate layer of raw rubber stock between the cured carcass and the injected rubber-forming material has the advantage of affording a transitional layer that promotes the desired excellent adhesion between the tread and the remainder of the tire casing.

Another advantageous feature of the form of the invention illustrated in detail above is that the tire carcass onto which the liquid is injected is backed up by a resilient and extensible curing bag. This makes it possible to control readily the amount of pressure applied to the assembly within the mold. Thus, by simply providing a definite pressure within the extensible curing bag, the unit pressure existing within the rubber-forming material can be raised at any time during the curing cycle to a value sufficient to insure complete dissolution of the evolved carbon dioxide. If desired, a relatively low pressure may obtain within the curing bag during the injection operation, to facilitate such injection, and also, such low pressure may be maintained during the early part of the cure to minimize leakage of the liquid material from the mold while it is still in a highly fluent state. The use of an extensible curing bag in combination with a previously vulcanized partial casing also represents a particular advantage of the invention as illustrated, because such combination facilitates proper dimensional control and structural uniformity, while still permitting great versatility in the amount of pressure to which the assembly is subjected at any given time.

The preferred form of the invention illustrated in connection with Fig. 10, involving separate storage and simultaneous mixing and charging of at least certain of the ingredients of the rubber-forming liquid has the advantage of permitting the use of unusually highly reactive combinations without danger of premature cure of the mixture. Thus, polyesters, diisocyanates and curing agents that would ordinarily react so rapidly as to produce a highly advanced non-fluid polymer within a short time can be handled in this manner, because the time lapse between final mixing of the ingredients and entrance of the mixture into the mold is so short.

The method involving mixing the polyester with water, and thereafter adding diisocyanate, is well adapted to the procedure of simultaneously metering the rubber-forming components in at least two separate parts into a mixing zone located immediately adjacent to the mold entrance, whereby the mixture flows into the mold without appreciable hold-up, once all of the essential rubber-forming components have come together.

The procedure involving first making a thorough, homogeneous mix of the water and polyester, followed by subsequent addition of the polyisocyanate, represents a most preferred and remarkable feature of the present process because in this way unusually fluent mixes are obtainable. In fact, this specific procedure has application to the casting or molding of shaped articles in general, such as shoe soles, etc. It is surprisingly found that such a procedure is capable of yielding the most easily pourable liquid compositions, such as would not ordinarily be obtainable in practice otherwise. This feature of the invention is entirely unexpected and unique. The alternate procedure of mixing the polyester and the diisocyanate, before adding the water, has a serious disadvantage in that the polyester-diisocyanate product is viscous and difficult to mix with the water. The mixing temperature must be quite elevated, i. e., well over 60° C., and usually 100° C. or more, to facilitate blending the water homogeneously with the polyester-diisocyanate product. At such elevated temperatures considerable foaming takes place due to rapid reaction of the water and consequent rapid evolution of carbon dioxide gas. The resulting mix is difficult to handle and difficult to inject.

An important characteristic of the rubber-forming liquid employed in the invention is that the entire liquid mass is converted to the rubbery state, unlike casting liquids based on solutions or dispersions wherein a large volume of the casting liquid is removed in the process of converting the material into a solid.

Having thus described our invention, what we claim and desire to protect by Letters Patent is:

1. A method of making a pneumatic tire comprising in combination the steps of providing a vulcanized tire carcass of rubberized textile reinforcing elements, said carcass being in tire shape and being devoid of a tread portion, enclosing said carcass within a mold having a cavity of such size and shape that the carcass makes fluid-sealing engagement with the walls of the mold cavity at definite predetermined areas while providing a definite predetermined spacing between the outer surface of the carcass and at least the tread area of the walls of the cavity, mixing a liquid composition of at least one material selected from the group consisting of polyesters and polyester amides, a diisocyanate, and a cross-linking agent for the resulting reaction product, injecting said mixture while still in a liquid, uncured state into the said mold to completely fill the said spacing defined between the surface of the carcass and the cavity walls, heating the said liquid to curing temperature within the cavity for a period of time sufficient to effect cure of the liquid mixture and thereby convert it to a solid, rubbery state while applying pressure to the mixture, and thereafter removing from the mold the resulting assembly of tire carcass and rubbery outer covering firmly adhered thereto.

2. A method of making a pneumatic tire comprising in combination the steps of providing a vulcanized, preshaped tire carcass devoid of a tread and surfaced at least over the tread area with a raw vulcanizable rubber stock, applying to the outer surface of the raw vulcanizable rubber stock a diisocyanate adhesive composition, mixing a flowable composition comprising at least one material selected from the group consisting of polyesters and polyester amides, a diisocyanate and a curing agent for the resulting reaction product, charging said flowable composition while still in a liquid uncured state to a mold cavity in which said carcass is confined in fluid-sealing engagement with said diisocyanate adhesive coated surface in predetermined spaced relation to the walls of the mold cavity, heating the said mold to effect cure of the said reaction product-curing agent mixture and simultaneous cure of said vulcanizable rubber stock while maintaining the said mixture under pressure, and subsequently removing the resulting assembly of tire carcass and firmly adhered cured polyurethane rubbery covering from the mold.

3. A method of making a pneumatic tire comprising in combination the steps of superimposing a plurality of plies of tire fabric coated with vulcanizable rubber carcass stock, vulcanizing the resulting tire carcass devoid of a tread portion in tire shape, disposing the vulcanized carcass enclosing an expansible curing bag in a mold cavity spaced from the exterior surface of the carcass at least over the tread area thereof, injecting a liquid rubber-forming composition of a polyester, a diisocyanate and water into the space thus provided between the mold and the carcass, while applying sufficient internal pressure within the curing bag to maintain the carcass in the desired shape, heating the mold to cause the said polyester diisocyanate-water mixture to be cross-linked to a solid rubbery state, while applying sufficient pressure to the interior of the curing bag to cause dissolution of carbon dioxide generated by reaction of the said water with the said polyester-diisocyanate, and subsequently removing the resulting assembly of carcass and firmly adhered cured polyurethane rubbery covering from the mold.

4. A method of making a pneumatic tire comprising in combination the steps of providing a tire carcass surfaced with vulcanizable rubber stock, enclosing said carcass in a mold defining a cavity over at least the tread surface of the carcass, said carcass enclosing an annular, extensible, inflatable member, applying to said inflatable member sufficient internal pressure to force surfaces of said carcass adjacent said cavity into fluid-sealing engagement with the mold walls, preparing a reactive polymerizablle composition of polyester, diisocyanate and curing agent, injecting said composition into said cavity before polymerization of the composition has proceeded to a stage where the viscosity of the composition attains a value of 100,000 poises, and thereafter heating the composition within the cavity to advance polymerization of the composition to a solid, rubbery stage, and removing from the mold the resulting assembly of tire carcass and firmly adhered polyurethane rubber covering.

5. A method of making a pneumatic tire comprising in combination the steps of providing a vulcanized rubber tire carcass the said carcass being in tire shape and being devoid of a tread, and being surfaced over its tread area with vulcanizable rubber stock, enclosing said carcass in a mold defining a cavity over the said tread area, said carcass enclosing an annular, extensible, inflatable member, applying to said inflatable member sufficient internal pressure to force surfaces of said carcass adjacent said tread area into fluid-sealing engagement with the mold walls, providing a partially polymerized reactive composition of polyester, diisocyanate and water, injecting said composition into said cavity before the polymerization has advanced to the stage where the composition has a viscosity of 10,000 poises, heating the composition within the cavity to advance further the polymerization thereof, applying a pressure of at least 100 p. s. i. to the said inflatable member before the polymerization has advanced to the stage where the composition has a viscosity of 100,000 poises and continuing said heating while maintaining said pressure until the polymerization advances to the solid, rubbery state, and thereafter removing from the mold the resulting assembly of tire carcass and polyurethane rubber tread covering.

6. A method of making pneumatic tires comprising in combination the steps of providing a cured tire carcass of rubberized fabric, said carcass being devoid of a tread, enclosing said carcass in tire shape in a mold defining a cavity at least over the tread portion of the carcass, the said carcass enclosing an expansible curing bag, intimately mixing a composition of a polyester and water to form a homogeneous blend, thereafter combining said blend with a diisocyanate and intimately mixing the resulting composition at a temperature of from 30° C. to 60° C., injecting the resulting mixture at said temperature into the said cavity before polymerization of the mixture has advanced to the extent that the mixture has a viscosity exceeding 1,000 poises, heating the mixture in the mold cavity to advance the polymerization to the solid, rubbery stage, while applying sufficient internal pressure within the curing bag to maintain carbon dioxide resulting from the cure of said mixture in solution in said mixture, and thereafter removing the resulting assembly of carcass and polyurethane rubber covering from the mold.

7. A method of making pneumatic tires comprising in combination the steps of providing a tire carcass of rubberized textile plies covered with vulcanizable rubber stock at least on its tread surface, the outer surface of said vulcanizable stock including a diisocyanate adhesive, disposing said carcass in a tire mold, the said carcass and mold defining a cavity having the shape of a desired rubber covering over the tread portion of the carcass, the said carcass enclosing an annular expansible curing bag, mixing a polyester of adipic acid, ethylene glycol and propylene glycol thoroughly with water, subsequently blending said mixture with p,p'-diphenylmethane diisocyanate at a temperature of about 50° C., immediately thereafter injecting the resulting mixture into said cavity while the mixture has a viscosity of about 50 poises, and continuing the polymerization of the mixture in the cavity at a temperature of about 320° F. while exerting a pressure of at least 100 p. s. i. on the mixture, the said pressure being exerted by means of pressure applied within the said curing bag, and subsequently removing from the mold the resulting assembly of tire carcass and polyurethane rubber covering.

8. A method of making a pneumatic tire having a tread composed of a rubbery polyurethane derived from a polyester, a diisocyanate and a curing agent containing active hydrogen and capable of converting the polyester and diisocyanate to a solid rubbery state upon heating, comprising in combination the steps of providing a precured, shaped tire casing devoid of a tread, at least the outer crown surface of said casing being composed of vulcanizable rubber stock containing tetramethylthiuram disulfide as accelerator, intimately blending the said polyester and curing agent to provide a liquid blend with which the said diisocyanate is readily miscible even at temperatures below 60° C., mixing the said diisocyanate with the said liquid blend to provide a liquid, readily flowable mass capable of being converted by heat to a solid rubbery state, placing the said casing devoid of tread into a mold defining a closed cavity having the shape of a desired tread about said vulcanizable rubber surface of the casing, the said casing enclosing an annular expansible member, injecting the said liquid mass into the said cavity into contact with the vulcanizable rubber surface, applying internal pressure within the said expansible member, and heating the mold to simultaneously cure the vulcanizable rubber surface and convert the liquid to a solid rubbery polyurethane, whereby there is formed on the said rubber surface a firmly attached rubber polyurethane tread.

References Cited in the file of this patent

UNITED STATES PATENTS

| | | |
|---|---|---|
| 1,019,506 | McCool | Mar. 5, 1912 |
| 1,559,702 | Hopkinson | Nov. 3, 1925 |
| 1,650,107 | Auger | Nov. 22, 1927 |
| 2,065,696 | Hawkinson | Dec. 29, 1936 |
| 2,476,831 | Spencer | July 19, 1949 |
| 2,476,884 | Maynard | July 19, 1949 |
| 2,497,226 | McNeill | Feb. 14, 1950 |
| 2,625,535 | Mastin et al. | Jan. 13, 1953 |
| 2,650,212 | Windemuth | Aug. 25, 1953 |
| 2,678,468 | Smith | May 18, 1954 |
| 2,686,554 | Hinman | Aug. 17, 1954 |
| 2,785,150 | Kreider et al. | Mar. 12, 1957 |

OTHER REFERENCES

"Modern Plastics," April 1954, "Polyurethane Resins," pp. 143, 144, 146, 228 and 229.